3,318,396
ROTARY DRILLING PROCESS
Rodolfo J. Tailleur, San Tome, Venezuela, assignor to Gulf Oil Corporation, Pittsburgh, Pa., a corporation of Pennsylvania
No Drawing. Filed Sept. 24, 1963, Ser. No. 311,231
8 Claims. (Cl. 175—72)

This invention relates to the rotary drilling of wells, and more particularly to the maintenance of a novel drilling mud composition during the drilling of wells.

In the rotary drilling method most frequently used for drilling wells, a bit is mounted on the lower end of drill pipe and is rotated against the bottom of the hole. A drilling mud is circulated down the hole, ordinarily through the drill pipe, and back up to the surface through the annulus between the drill pipe and the borehole wall. The drilling mud serves several purposes. It supplies a fluid medium for carrying the cuttings from the hole to the surface, exerts a hydrostatic pressure against the borehole wall which opposes flow of subsurface fluids into the borehole during the drilling operation, cools the bit, and in some instances forms a filter cake of low permeability on the borehole wall to prevent flow of the fluids from the borehole into the formations penetrated thereby. Frequently extreme pressure lubricating additives are incorporated in the drilling mud, and in such instances the drilling mud lubricates the bearings of the drill bit.

Drilling muds are frequently complex liquid compositions in which the liquid phase may be water, oil, or an emulsion of water and oil. If it is expected that the well will penetrate formations subjected to high fluid pressures of gas, salt water, or oil, finely divided particles of an inert weighting agent are suspended in the drilling mud to increase its density and thereby increase the hydrostatic pressure exerted by the drilling mud on the formations penetrated by the well. Barite is a preferred weighting agent. Ordinarily, clay solids are incorporated in the drilling mud. They may be added deliberately in the form of bentonite or other clay minerals during the making up of the mud to increase the viscosity and thixotropy of the mud to the desired range, or may result from dispersion of clays or shales penetrated during the drilling of the well. Frequently, clay is introduced into the drilling mud in excessive amounts as a result of drilling through clays and shales, and it is then necessary to add additional chemicals to the mud to counteract the effect of the clay. The clay solids also aid in the creation of a filter cake of low permeability on the borehole wall, and thereby reduce the loss of liquid from the drilling mud.

A number of other chemicals, some of which are soluble, are added to drilling muds to control the properties of the muds. For example, thinning agents such as alkali metal pyrophosphates, tannins, and mined lignites are incorporated in the mud to reduce its viscosity. Sodium carbonate and sodium hydroxide are used to control the pH of the drilling mud. Starches and carboxymethyl cellulose are frequently incorporated in drilling mud as water loss additives.

During the drilling of wells by the rotary method with aqueous drilling muds, clays and shales penetrated by the borehole are hydrated by the drilling mud and dispersed in the drilling mud. Hydration of the clays frequently results in heaving of the shales penetrated by the well, which in some instances causes the drill pipe to stick. Tendencies of the drill pipe to stick may be further aggravated, as is hole enlargement, by the undermining and resultant breaking of more resistant shales as a result of the dispersion of clays. Both the hydration and dispersion of clays and the mechanical breaking of shale ledges greatly increase the amount of solids in the drilling mud. One effect of the hole enlargement is to cause a substantial increase in the volume of mud in the system and, hence, the amount of additives which must be incorporated in the drilling mud to impart the desired properties to the mud. Drillers have attempted to counteract the reduced mud velocity in the annulus resulting from hole enlargement by increasing the viscosity of the drilling mud and increasing the size of the jets in the drill bits. Both the reduced jet velocity caused by enlargement of the jets and the increase in mud viscosity reduce drilling rates.

Another effect of the hole enlargement is to increase the amount of clay solids suspended in the mud with a resultant increase in the viscosity of the drilling mud. Several methods are used to counteract the increase in viscosity. Thinning agents such as the pyrophosphates cause a reduction in mud viscosity; however, I have found that sodium pyrophosphate, being a highly effective dispersing agent, also aggravates the hole enlargement by dispersing clays and shales of the borehole wall. Drilling mud viscosity is also controlled by adding water to the mud. It will be appreciated that the addition of water further increases the volume of the drilling mud, and it is then necessary to control the volume of mud in the system by discarding a substantially equal volume of drilling mud therein. The loss of soluble chemicals in the discarded drilling mud further increases the drilling mud cost.

This invention resides in a rotary method of drilling a well with an aqueous drilling mud as the circulating medium in which enlargement of the borehole beyond the gauge of the drill bit is reduced by maintaining the concentration of the potassium ion in the drilling mud above 50 parts per million, preferably higher than 250 parts per million, and still more desirably in excess of 500 parts per million. I have found that unlike other alkali metal ions, the potassium ion is removed preferentially from the drilling mud by clays in the drilling mud during the preparation of the drilling mud and the drilling operation. Large initial additions of the potassium compounds are required to, in effect, "saturate" clay in the drilling mud with potassium ions and must be followed by frequent periodic additions of a substantial amount of potassium compounds to fulfill the requirements of additional clay incorporated in the drilling mud as drilling progresses and thereby maintain the necessary concentration of potassium ions in the drilling mud.

Although this invention is not limited to any theory of any mechanism by which the novel drilling muds function, it is believed that the reduction in borehole enlargement is caused by the potassium ion being of a size which fits snugly in the crystal lattice of clays and is difficult to displace from the crystal lattice. The potassium ion also forms a bridge holding two crystal units tightly together. Because of the unique property of potassium ions upon entering the crystal lattice of clays, clays, particularly of montmorillonite type, are made water resistant, and are not readily dispersed in aqueous solutions containing concentrations of potassium ions in excess of 30 parts per million. The tightness with which the potassium ions, unlike other metal alkali ions, are held in place in the crystal lattice of the clays causes potassium ions to be continually removed from the drilling mud and makes necessary frequent additions of potassium compounds to the drilling mud to maintain the required concentration of potassium ions in the drilling mud.

A wide variety of potassium compounds are suitable sources of the potassium ions. In general, it is desirable to incorporate the potassium ion in the drilling muds in the form of a compound, the anion of which is normally added to the drilling mud for control of drilling mud properties. For example, the potassium ion can be added to the drilling mud in the form of caustic potash for pH control, or in combination with quebracho as a thinner. Potassium carbonate can be substituted for the sodium carbonate frequently incorporated in drilling mud for pH control or to precipitate calcium ions and thereby introduce potassium ions into the drilling mud. Various molecularly dehydrated sodium phosphates and polyphosphates are widely used in drilling muds as thinners. Molecularly dehydrated potassium phosphates and polyphosphates can be substituted for the corresponding sodium salts to incorporate the potassium ion in the drilling mud and control the viscosity of the drilling mud.

Preferentially oil-soluble emulsifiers commonly used in oil-emulsion drilling muds are the sodium salts of petroleum sulfonates, tall oil, tall oil pitches, mined lignites, etc. It is advantageous in this invention to substitute the corresponding potassium salts for the sodium salt whereby the emulsifier then serves a dual purpose. The potassium ion acts as an inhibitor reducing the mud making ability of the clay, thereby reducing hole enlargement, and the anion serves as an emulsifier. Potassium humates are especially useful emulsifiers in providing potassium ions in a compound that has an ion which is substantially inert in its effects on the viscosity of the drilling mud. Moreover, the humic acid anion is effective as a scavenger, or precipitant, of calcium and magnesium, and will reduce the concentration of those ions to low levels at which they will not form insoluble soaps in drilling muds containing extreme pressure lubricant additives.

Frequently, soaps of sulfurized fatty acids, for example, soaps of sulfurized fatty acids having 12 or more carbon atoms per molecule, such as soaps of sulfurized tall oil, are incorporated in drilling muds to impart extreme pressure lubricating properties to the drilling muds. The potassium soaps of such sulfurized fatty acids are a preferred source of potassium compounds useful in this invention. Because the potassium introduced into the drilling mud with such extreme pressure (EP) drilling mud additives becomes locked in clays penetrated by the borehole, it is necessary to make frequent additions of the potassium soaps beyond the additions required to impart the desired EP lubricating properties to the drilling mud or other potassium compounds to maintain the desired potassium ion concentration.

It is recognized that the addition to aqueous drilling muds of potassium salts of the types listed above has been suggested frequently in publications and patents. Such suggestions are of the addition of alkali metal salts to drilling muds for the purpose of introducing a desired anion into the drilling mud to control a property of the drilling mud in a desired manner. No distinction is made in such suggestions between potassium compounds and corresponding compounds of other alkali metals. In fact, generally if any preference is indicated, the preference is for the sodium salt. In practice in the field, sodium compounds are used almost exclusively primarily because they cost less than the corresponding potassium compounds. The suggestions in the literature are for the introduction of a compound in amounts to maintain a desired concentration of the desired anion. Because the anions do not become locked in the shales and clays in the manner of potassium ions, and are not removed from the drilling mud, the frequent addition of the anions is not necessary as it is to maintain a concentration of potassium ions effective to minimize borehole enlargement.

The preferential adsorption by clay of potassium ions from aqueous solutions containing potassium ions and sodium ions is illustrated by the results, presented in Table I, of contacting such solutions with bentonite. A 0.01 normal solution of sodium chloride was prepared to simulate the salinity of drilling muds prepared from fresh water available in the field. Potassium chloride was added to separate samples of the 0.01 normal sodium chloride solution in concentrations to form aqueous solutions 0.1 normal and 0.01 normal respectively in potassium ions. Sixty grams of bentonite were thoroughly mixed with 700 ml. of each of the samples, and the suspension was permitted to age overnight. Each of the samples was filtered and the filtrate analyzed for potassium ion, calcium ion, and chloride ion. The concentration of sodium was obtained by difference.

The procedure described above was repeated for 0.1 normal and 0.5 normal sodium chloride solutions containing the potassium ion concentrations set forth in Table I. The 0.1 normal corresponds to a drilling mud prepared from brackish water and 0.5 normal to drilling mud prepared from sea water. Analyses for chloride ion indicated that the chloride ion was not adsorbed by the bentonite in any of the samples.

TABLE I

| Sample No. | Initial Ionic Concentration | Milliequivalent Adsorbed By 100 Grams of Clay | Milliequivalent Released By 100 Grams of Clay |
| --- | --- | --- | --- |
| 1 | K, 0.1 N | 32.5 | 0 |
|   | Na, 0.01 N | 0 | 26.7 |
|   | Ca | 0 | 5.8 |
| 2 | K, 0.01 N | 5.0 | 0 |
|   | Na, 0.01 N | 0 | 3.3 |
|   | Ca | 0 | 1.7 |
| 3 | K, 1 N | 123.4 | 0 |
|   | Na, 0.1 N | 0 | 105.9 |
|   | Ca | 0 | 17.5 |
| 4 | K, 0.02 N | 12.1 | 0 |
|   | Na, 0.1 N | 0 | 5.1 |
|   | Ca | 0 | 7.0 |
| 5 | K, 0.5 N | 95.3 | 0 |
|   | Na, 0.5 N | 0 | 78.3 |
|   | Ca, 0 | 0 | 17.0 |
| 6 | K, 0.1 N | 22.5 | 0 |
|   | Na, 0.5 N | 0 | 9.0 |
|   | Ca, 0 | 0 | 13.5 |

It will be noted that in all instances reported in Table I potassium ion was preferentially adsorbed by the clay even though the concentration of sodium ion in the aqueous solution contacted by the clay was as much as five times as high as the concentration of potassium ion. In fact, the adsorption of the potassium ion by the clay resulted in release of calcium ions and sodium ions from the clay. The data presented in Table I show the clays incorporated in drilling muds will remove potassium ions from the drilling muds; hence, the initial incorporation of drilling mud chemicals containing potassium ions will not insure maintenance of potassium ion in the liquid phase of the drilling mud. A corresponding removal of sodium ions from drilling muds does not occur.

The apparent removal of potassium ions from solution by clays in drilling muds is illustrated by the relatively low potassium ion concentrations in drilling muds to which substantial amounts of potassium compounds have been added. Total additions of potassium compounds to drilling muds used in drilling wells in three fields in Venezuela and the average potassium ion concentration in the drilling mud filtrate are presented in Table II.

TABLE II.—POUNDS OF POTASSIUM ADDED TO DRILLING MUDS

| Well | ZG-321 | CG-16 | CG-20 | ZG-334 | AM-63 | AM-64 |
|---|---|---|---|---|---|---|
| K, lbs. in— | | | | | | |
| $K_2CO_3$ | 1,613 | | 896 | 1,008 | 605 | |
| KOH | | 835 | 1,600 | 4,524 | 557 | 2,228 |
| $K_4P_2O_7$ | | 708 | | 283 | 141 | 1,038 |
| Sulfur K Tallate | 8,170 | 3,344 | 3,135 | 5,510 | 3,287 | 2,110 |
| Total K, lbs | 9,783 | 4,887 | 5,631 | 11,325 | 4,590 | 5,376 |
| Avg. K+ Concentration in Mud Filtrate | 500 | 50 | 400 | 540 | 50 | 500 |

9,783 pounds of potassium were used in the drilling mud for Well ZG-321 yet the average potassium ion concentration in the drilling mud was only approximately 500 parts per million. If all of the potassium ion added to the drilling mud for that well had remained in the mud filtrate, the amount of potassium compounds added would have been adequate to prepare 50,000 barrels of drilling mud. Calculations for the other wells indicate that the potassium is adequate for volumes of drilling mud far above the volume required for drilling wells. Ordinary experience would indicate that the total volume of drilling mud used in drilling a well would not exceed approximately 2,000 barrels. Removal of potassium ions from the filtrate is further indicated by comparison of Wells CG-16 and CG-20. A small increase in the amount of potassium compounds added to the drilling mud resulted in an approximately tenfold increase in the potassium ion concentration of the mud filtrate. Presumably the major part of the potassium ions added in Well CG-16 was used to saturate the clay in the drilling mud.

The value of the adsorption of potassium ions by clays in the drilling of wells shows up principally in reduction of enlargement of the borehole above the gauge of the drill bit. A substantial reduction in borehole enlargement resulting from the maintenance of the potassium ion concentration above approximately 50 parts per million has been experienced in field operations. In the Santa Anna field, Well No. AM-61 was drilled with a conventional oil-in-water emulsion mud containing the usual chemicals to control viscosity and water loss but no potassium compounds. Periodic tests were made to determine the concentration of potassium ion in the mud filtrate. The tests showed that no potassium was present in the mud filtrate. Well No. AM-63 was drilled in the Santa Anna field adjacent Well No. AM-61. Sulfurized potassium tall oil soap was added to the drilling mud in concentrations of approximately 3.5 percent designed to improve the EP lubricating properties of the drilling mud. Potassium carbonate, potassium hydroxide, and tetrapotassium pyrophosphate were added to the drilling mud to increase the K+ concentration. Periodically samples of drilling mud were taken and the mud filtrate analyzed to determine the potassium concentration. Well No. AM-64 was drilled in the Santa Anna field one location from Well No. AM-61. Periodically samples of the drilling mud were taken, the mud filtrate analyzed for potassium ion concentration, and potassium carbonate and tetra pyrophosphate were added to the drilling mud in amounts required to maintain the potassium ion concentration within the range of 360 to 720 parts per million, with an average of approximately 500 parts per million. Caliper logs were made for each of Wells Nos. AM-61, AM-63, and AM-64. The results of the caliper logs are presented in Table III.

The procedure described for the wells in the Santa Anna field was repeated in three wells, Nos. CG-15, CG-16, and CG-20, in the La Ceiba field. Well No. CG-15 was drilled with conventional oil emulsion mud to which no potassium compounds were added. Well No. CG-16 was drilled with an oil-emulsion mud to which the sulfurized potassium soap of tall oil was added in concentrations required to increase the EP lubricating properties of the drilling mud. Additions of tetrapotassium pyrophosphate and caustic potash, as indicated in Table II, increased the potassium ion concentration to approximately 50 parts per million. Well No. CG-20 was drilled with a mud similar to that added in Well No. CG-16, but in which the potassium ion level in the mud filtrate was maintained above 400 parts per million by the periodic addition of potassium carbonate, caustic potash, and tetrapotassium pyrophosphate. Caliper logs were run on Wells Nos. CG-15, CG-16, and CG-20. The results of the caliper logs are presented in Table III.

Adjacent Wells Nos. ZG-333 and ZG-334 were drilled in the Zapatos field. Well No. ZG-333 was drilled with an oil-emulsion drilling mud to which no potassium compounds were added, and Well No. ZG-334 with an oil-emulsion drilling mud to which the sulfurized potassium soap of tall oil was added to give the mud the desired EP lubricating properties. Other potassium compounds listed in Table II were periodically added to the drilling mud, as indicated to be necessary by periodic analyses of the mud filtrate, to maintain the potassium ion concentration in the drilling mud above approximately 540 parts per million. Caliper logs were run on Wells Nos. ZG-333 and ZG-334. The results of the logs are presented in Table III.

The reduction in hole enlargement resulting from the maintenance of potassium ion concentration in the drilling mud above about 50 parts per million is not obtained by the maintenance of high calcium ion concentrations in the drilling mud. In the Zapatos field, Wells Nos. ZM-311, ZM-323, and ZG-321 were drilled in nearby locations. Well No. ZM-311 was drilled with a calcium base oil-emulsion drilling mud, Well No. ZM-323 with conventional oil-emulsion drilling mud, and Well No. ZG-321 with an oil-emulsion drilling mud similar to the mud used in Well No. ZG-323 but into which 193,500 pounds of the sulfurized soap of potassium with 3,600 pounds of potassium carbonate were added during the drilling operation in periodic additions which greatly exceeded amounts required to give the mud EP lubricating properties but which are effective in maintaining a high potassium ion concentration. Caliper logs were run on the wells. The results are presented in Table III.

TABLE III

| Well No. | Type of Drilling Mud | Average Potassium Ion Concentration, p.p.m. | Average Borehole Diameter |
|---|---|---|---|
| AM-61 | Oil-Emulsion | 0 | 9.8 |
| AM-63 | Oil-Emulsion+K Soap+ K Salts. | 50 | 9.2 |
| AM-64 | ---do--- | 500 | 8.7 |
| CG-15 | Oil-Emulsion | 0 | 12.4 |
| CG-16 | Oil-Emulsion+K Soap+ K Salts. | 50 | 11.2 |
| CG-20 | ---do--- | 400 | 8.9 |
| ZG-333 | Oil-Emulsion | 0 | 10.2 |
| ZG-334 | Oil-Emulsion+K Soap+ K Salts. | 540 | *10.2 |
| ZM-311 | Calcium-Base | 0 | 10.1 |
| ZM-323 | Oil-Emulsion | 0 | 10.2 |
| ZG-321 | Oil-Emulsion—Large K Soap Additions. | 500 | 9.3 |

*Well No. ZG-334 was drilled with a 9⅝ inch bit. All other wells were drilled with 8½ inch bits.

The drilling muds described in Table III as oil-emulsion drilling muds were emulsions of hydrocarbon oil in water and contained sodium compounds such as sodium acid pyrophosphate, sodium hydroxide, and sodium carbonate in conventional amounts to control the properties of the drilling mud. Thus, in general, the drilling muds contained substantially the same anions as the drilling muds to which potassium compounds were added, but the anions were introduced in the form of sodium salts. Additionally the drilling muds listed simply as oil-emulsion drilling muds contained quebracho used in combination with sodium hydroxide to reduce the viscosity of the drilling mud, and carboxymethyl cellulose to reduce the water loss of the drilling mud.

It will be noticed that in every instance the periodic addition of potassium ion compound to maintain the concentration of the potassium ion in the mud filtrate above 50 parts per million caused a marked reduction in the average borehole diameter. Still further reduction in average borehole diameter was accomplished by adding potassium compounds in amounts adequate to maintain the potassium ion concentration at approximately 500 parts per million.

The reduced hydration of clays resulting from the maintenance of the potassium ion concentration in the mud filtrate above 50 parts per million is further illustrated by a reduction in the amount of quebracho required to maintain the viscosity of the drilling mud within the desired range. In Well No. CG–16 the use of quebracho as a thinner was completely eliminated. The amount of quebracho used in Well No. ZG–321 was only approximately one-third the amount used in Well No. ZM–323, and the amount used in Well No. AM–63 was only about three-fifths the amount used in Well No. AM–61.

The maintenance of the potassium ion concentration in the mud filtrate above 50 parts per million is effective in reducing hydration and dispersion of clays in wells drilled with any drilling muds in which there is a separate aqueous phase. The advantages of maintaining the high potassium ion concentration are most apparent in aqueous drilling muds or oil-in-water emulsion drilling muds. The invention has been particularly effective in reducing hole enlargement of wells in which emulsions of diesel oil in water were used as the drilling mud. Because hydration of clays is not serious in wells drilled with invert emulsion drilling muds, maintenance of a high potassium ion concentration in such muds is not as important as in the water-base or oil-in-water emulsion drilling muds.

I claim:

1. A method of drilling a well through clay and shale formations by a rotary drilling process in which an aqueous liquid is circulated down the well through one of a drill pipe and the annulus surrounding the drill pipe and returned upwardly through the well through the other of said drill pipe and annulus, said method comprising admixing with said liquid a potassium compound in amounts to give a concentration of potassium ion in the liquid in excess of 50 parts per million, circulating the liquid through the well, and periodically adding to the liquid additional potassium compound to maintain the concentration of potassium ion in the drilling mud liquid in excess of 50 parts per million.

2. A method of drilling as set forth in claim 1 in which the potassium compounds are added in quantities to give a concentration of potassium ions of at least 250 parts per million in the aqueous liquid.

3. A method as set forth in claim 1 in which the potassium compounds are added to the drilling mud in quantities effective to give a potassium ion concentration in the aqueous liquid of at least 500 parts per million.

4. A method of reducing enlargement of the borehole of a well while drilling the well through clay and shale formations by a rotary drilling method in which an aqueous drilling mud is circulated down the well through one of a drill pipe and the annulus surrounding the drill pipe, and up through the other of the drill pipe and the annulus surrounding the drill pipe, said method comprising determining the concentration of the potassium ion in the drilling mud, adding a potassium compound to the drilling mud in an amount to increase the concentration of potassium ion in the aqueous drilling mud to more than 50 parts per million of the aqueous drilling mud, continuing the circulation of the drilling mud in the well whereby the drilling mud contacts clays in the borehole wall and potassium ions are taken from the drilling mud, and periodically repeating the determination of the potassium ion concentration and addition of potassium compounds to the drilling mud in amounts adequate to maintain the concentration of potassium ions in the drilling mud liquid above 50 parts per million.

5. In a rotary drilling process for the drilling of wells through clay and shale formations in which a drill bit is rotated on the lower end of drill pipe at the bottom of the well to cut formations penetrated by the borehole of the well, the improvement comprising pumping down the drill pipe a drilling mud comprising an aqueous liquid, clay solids suspended in the aqueous liquid, potassium pyrophosphate in solution in the liquid in an amount to reduce the viscosity of the drilling mud and an alkali potassium compound selected from the group consisting of potassium carbonate and potassium hydroxide in a concentration to control the pH of the drilling mud, circulating the drilling liquid from the bottom of the borehole up through the annulus surrounding the drill pipe in contact with the borehole wall to stabilize clays in the borehole wall and carry cuttings from the well, and periodically adding to the drilling mud a potassium compound in an amount effective to maintain a potassium ion concentration in the aqueous liquid of at least 50 parts per million.

6. In a rotary drilling process for the drilling of wells through clay and shale formations in which a drill bit is rotated on the lower end of drill pipe at the bottom of the well to cut formations penetrated by the borehole of the well, the improvement comprising pumping down the drill pipe a drilling mud comprising an aqueous liquid, clay solids suspended in the aqueous liquid, a hydrocarbon oil emulsified in said aqueous liquid with the aqueous liquid as a continuous phase, an emulsifier selected from the group consisting of potassium petroleum sulfonates, potassium soaps of sulfurized fatty acids having 12 or more carbon atoms per molecule and potassium humates in amounts effective to form a stable emulsion and other potassium compounds in amounts effective to give a potassium ion concentration in the aqueous liquid of at least 50 parts per million, circulating the drilling liquid from the bottom of the borehole up through the annulus surrounding the drill pipe in contact with the borehole wall to stabilize clays in the borehole wall and carry cuttings from the well, and periodically adding to the drilling mud a potassium compound in an amount effective to maintain a potassium ion concentration in the aqueous liquid of at least 50 parts per million.

7. In a rotary drilling process for the drilling of wells through clay and shale formations in which a drill bit is rotated on the lower end of drill pipe at the bottom of the well to cut formations penetrated by the borehole of the well, the improvement comprising pumping down the drill pipe a drilling mud comprising an aqueous liquid, clay solids suspended in the aqueous liquid, a hydrocarbon oil emulsified in the aqueous liquid with the aqueous liquid as a continuous phase and potassium humates in quantities effective to emulsify the hydrocarbon oil and aqueous liquid and other potassium compounds in a concentration to give a potassium ion concentration in the aqueous liquid of at least 50 parts per million, circulating the drilling liquid from the bottom of the borehole up through the annulus surrounding the drill pipe in contact with the borehole wall to stabilize clays in the borehole wall and carry cuttings from the well, and periodically adding to the drilling mud a potassium compound in an amount effective to maintain a potassium ion concentration in the aqueous liquid of at least 50 parts per million.

8. In a rotary drilling process for the drilling of wells through clay and shale formations in which a drill bit is rotated on the lower end of drill pipe at the bottom of the well to cut formations penetrated by the borehole of the well, the improvement comprising pumping down the drill pipe a drilling mud comprising an aqueous liquid, clay solids suspended in the aqueous liquid, potassium pyrophosphate in solution in the liquid in an amount to reduce the viscosity of the drilling mud and an alkali potassium compound selected from the group consisting of potassium carbonate and potassium hydroxide in a concentration to control the pH of the drilling mud, circulating the drilling liquid from the bottom of the borehole up through the annulus surrounding the drill pipe in contact with the borehole wall to stabilize clays in the borehole wall and carry cuttings from the well, and periodically adding to the aqueous liquid at least one potassium compound selected from the group consisting of potassium hydroxide, potassium carbonate and tetrapotassium pyrophosphate to maintain a potassium ion concentration in the drilling mud in the well of at least 50 parts per million.

References Cited by the Examiner
UNITED STATES PATENTS

| | | | |
|---|---|---|---|
| 1,460,788 | 7/1923 | Carman | 252—8.5 |
| 2,109,858 | 3/1938 | Cannon | 252—8.5 |
| 2,223,933 | 12/1940 | Garrison | 166—30 |
| 3,009,874 | 11/1961 | Chisholm | 252—8.5 |
| 3,079,335 | 2/1963 | Clem et al. | 252—8.5 |
| 3,146,199 | 8/1964 | Salathiel et al. | 252—8.5 |
| 3,236,769 | 2/1966 | Burdyn et al. | 252—8.5 |

CHARLES E. O'CONNELL, *Primary Examiner.*

J. A. LEPPINK, *Assistant Examiner.*